(12) United States Patent
Fritz

(10) Patent No.: US 9,527,431 B2
(45) Date of Patent: Dec. 27, 2016

(54) VEHICLE EXTERIOR MIRROR WITH ADAPTIVELY ACTIVATED FORWARD LIGHTING UNIT

(75) Inventor: Daniel Fritz, Stuttgart (DE)

(73) Assignee: SMR Patents S.a.r.l., Luxembourg (LU)

( * ) Notice: Subject to any disclaimer, the term of this patent is extended or adjusted under 35 U.S.C. 154(b) by 373 days.

(21) Appl. No.: 14/129,559

(22) PCT Filed: Jun. 26, 2012

(86) PCT No.: PCT/EP2012/062360
§ 371 (c)(1),
(2), (4) Date: Feb. 10, 2014

(87) PCT Pub. No.: WO2013/000913
PCT Pub. Date: Jan. 3, 2013

(65) Prior Publication Data
US 2014/0218946 A1      Aug. 7, 2014

(30) Foreign Application Priority Data

Jun. 29, 2011   (DE) .................. 10 2011 105 983

(51) Int. Cl.
*B60Q 1/24*      (2006.01)
*B60Q 1/12*      (2006.01)
(Continued)

(52) U.S. Cl.
CPC . *B60Q 1/12* (2013.01); *B60Q 1/04* (2013.01); *B60Q 1/2665* (2013.01);
(Continued)

(58) Field of Classification Search
CPC ................ F21S 8/12; B60Q 1/08; B60Q 1/12; B60Q 1/16; B60Q 1/18; B60Q 1/2665; B60Q 11/007; B60Q 2300/122
See application file for complete search history.

(56) References Cited

U.S. PATENT DOCUMENTS 2,561,582 A * 7/1951 Marbel ................ B60Q 1/2665
340/475
2,595,331 A * 5/1952 Calihan ................ B60Q 1/2665
248/901

(Continued)

FOREIGN PATENT DOCUMENTS

DE       102006039182 A1    3/2008
DE       102007000371 A1    3/2008
(Continued)

OTHER PUBLICATIONS

International Search Report and Written Opinion, PCT/EP2012/062360, dated Jan. 16, 2014.

*Primary Examiner* — Ismael Negron
(74) *Attorney, Agent, or Firm* — MacMillan, Sobanski & Todd, LLC

(57) ABSTRACT

A light system for a motor vehicle includes an exterior mirror head housing at least one lighting module having a plurality of LEDs arranged in sectors to provide different lighting functionalities. At least one LED of at least one light sector is activated in response to the speed of the vehicle, and other vehicle parameters such as steering angle, turn-signal blinker activation, and running lights activation. The LEDs of the lighting module may also function as marker lights or turn-signal blinker lights.

15 Claims, 3 Drawing Sheets

(51) Int. Cl.
  *B60Q 1/26*  (2006.01)
  *B60Q 1/04*  (2006.01)

(52) U.S. Cl.
  CPC .. *B60Q 2300/112* (2013.01); *B60Q 2300/122* (2013.01); *B60Q 2300/142* (2013.01); *B60Q 2300/31* (2013.01); *B60Q 2400/30* (2013.01)

(56) References Cited

U.S. PATENT DOCUMENTS

| | | | | |
|---|---|---|---|---|
| 4,733,333 | A * | 3/1988 | Shibata | B60Q 1/122 362/346 |
| 5,428,512 | A | 6/1995 | Mouzas | |
| 5,499,169 | A * | 3/1996 | Chen | B60Q 1/24 362/494 |
| 6,049,271 | A * | 4/2000 | Chu | B60R 1/1207 340/463 |
| 6,250,784 | B1 * | 6/2001 | Kayama | B60Q 1/2665 362/135 |
| 6,561,685 | B2 * | 5/2003 | Weber | B60R 1/1207 315/185 R |
| 6,769,798 | B2 * | 8/2004 | Mishimagi | B60Q 1/2665 362/494 |
| 7,255,464 | B2 * | 8/2007 | Rodriguez Barros | B60Q 1/2665 362/494 |
| 8,080,942 | B2 | 12/2011 | Heider et al. | |
| 8,382,351 | B2 * | 2/2013 | Ishikawa | B60Q 1/2665 362/249.02 |
| 8,764,256 | B2 * | 7/2014 | Foote | B60R 1/12 362/494 |
| 2002/0089418 | A1 * | 7/2002 | Shy | B60Q 1/2665 340/463 |
| 2004/0151004 | A1 * | 8/2004 | Shih | B60Q 1/2665 362/494 |
| 2006/0146555 | A1 | 7/2006 | Inaba | |

FOREIGN PATENT DOCUMENTS

| | | |
|---|---|---|
| DE | 102006048503 A1 | 4/2008 |
| DE | 102008005702 A1 | 7/2009 |
| EP | 1304260 A1 | 4/2003 |
| EP | 2221219 A1 | 8/2010 |
| WO | 2007122544 A1 | 11/2007 |
| WO | 2008137634 A1 | 11/2008 |

\* cited by examiner

VEHICLE EXTERIOR MIRROR WITH ADAPTIVELY ACTIVATED FORWARD LIGHTING UNIT

There are various systems available today for adaptive front-lighting of a vehicle. These systems seek to provide dynamic front-lighting, or curve lighting functionality, for a vehicle.

The systems that are currently available typically use mechanical systems to provide the curve lighting functionality. For example, motors, such as stepper motors, may rotate a lens, a reflector, a mount, or a light source of a headlamp, or an entire light module. The stepper motors may receive signals to steer the light beam in horizontal and/or vertical directions. A particular steering angle of the light beam may be defined as a function of vehicle speed and steering wheel angle. In addition, a typical range of rotation of the light beam may be ±15 degrees left/right and ±15 degrees up/down. As a result, a roadway may be more effectively illuminated by the curve lighting functionality, thereby increasing safety and comfort.

The Patent Application DE 10 2006 039 182 A1 describes a vehicle having a light radiating device with two or more LED segments, and a control device to vary the emitted radiation intensity of the LED segments.

An adaptive front-lighting system that is referred to as "Pixel Light" has also been proposed. In this system, micro mirror devices each reflect one pixel of a light beam. Further, the light beam is fixed in place but can be programmed to suit the conditions in front of a vehicle. PCT International Published Patent Application No. PCT/IB2007/051355 describes a system that places a liquid crystal element in front of a light source in order to steer the light beam.

A system having at least one semiconductor light source is known from EP 2221219, said semiconductor light source being integrated in a specified position in a daytime running light module of the vehicle. This means that the at least one semiconductor light source is arranged in the daytime running light module in a fixed or stationary position. In order to produce the curve light and/or deflecting light function, the at least one semiconductor light source is not rotated or pivoted, but remains connected to the vehicle.

All of the known solutions for active curve lighting have the disadvantage that an area to the side of the vehicle cannot be illuminated due to the mounting position of the headlamp.

The invention solves this problem by also using additional lighting in the exterior mirror, which is referred to as a short-range, adaptive cornering light.

DESCRIPTION OF THE INVENTION

The invention will now be explained by means of example embodiments with reference to the drawings, wherein.

Figure 1:
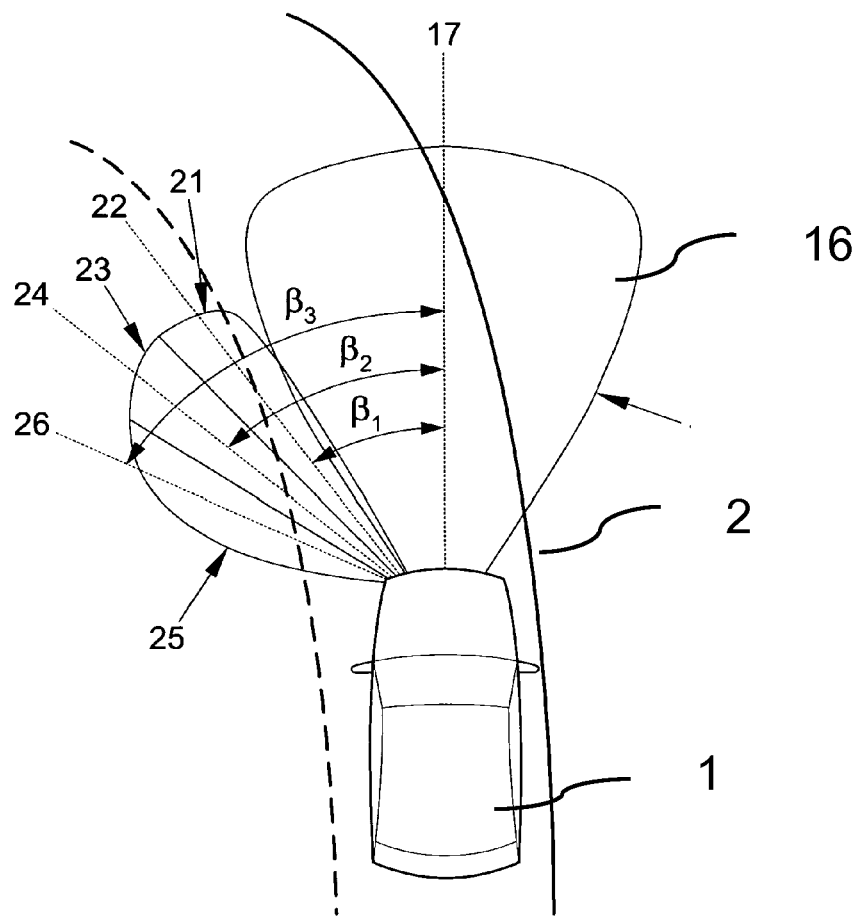
FIG. 1 is a schematic top view of a lighting distribution using a system for electronic adaptive front-lighting of a vehicle.

FIG. 1 shows a schematic top view of a lighting distribution using a system for electronic adaptive front-lighting of a vehicle. This figure illustrates a driving situation in which the vehicle 1 is driving along a roadway 2 curving towards the left. In addition, this figure illustrates an example embodiment of an electronic adaptive front-lighting system LED module in the headlamp with three different light sectors L1, L2, L3.

As shown in FIG. 1, the low-beam light source projects a standard light distribution 16 having a center axis 17 forward of the vehicle. In addition, the light sectors L1, L2, L3 project beams of light having illumination distributions 21, 23, 25, respectively, and having center axes 22, 24, 26 of said distributions 21, 23, and 25, respectively, at angles $\beta 1$, $\beta 2$, $\beta 33$, respectively, from the center axis 17 of the standard light distribution 16. The light distributions 21, 23, 25 illuminate areas forward and to the left of the vehicle for the driving situation in which the vehicle is driving along a roadway curving towards the left.

Each of the light sectors L1, L2, L3 may include one or more LEDs, based on the LED type and the amount of light required for each sector. In addition, the light intensity of each of the light sectors may be independently controlled. In this manner, the light distributions 16, 21, 23, 25 may be optimally controlled based on a particular driving situation, such as a vehicle speed, a steering wheel angle, a proximity to other vehicles, a selected driving comfort/behavior programmed, an actuation of an input device such as a switch or any other human-machine interface, or road characteristics such as curvature or width, etc.

Further, each LED of each light sector may include an optical element to assure smoother light distribution throughout the illumination area of each light sector. The optical element may include a lens, a reflector, etc. The particular optical element utilized may depend upon the particular angles $\beta_1$, $\beta_2$, $\beta_3$ and the size of the desired illumination area for each light sector L1, L2, L3, for example.

Figure 2:
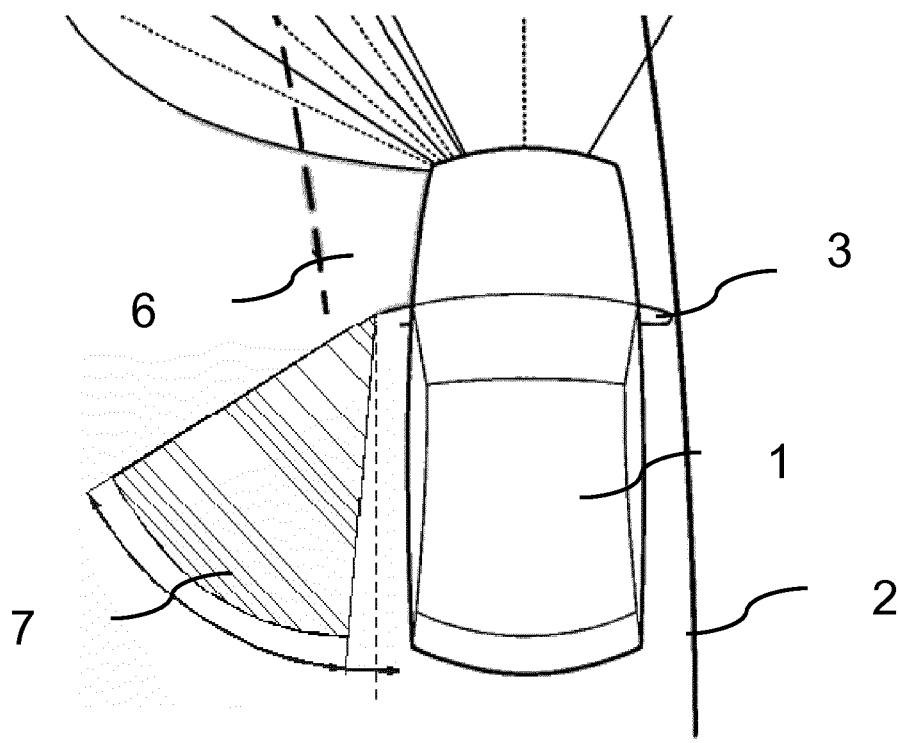
FIG. 2 illustrates the illumination distribution areas of the invention.
Figure 3:
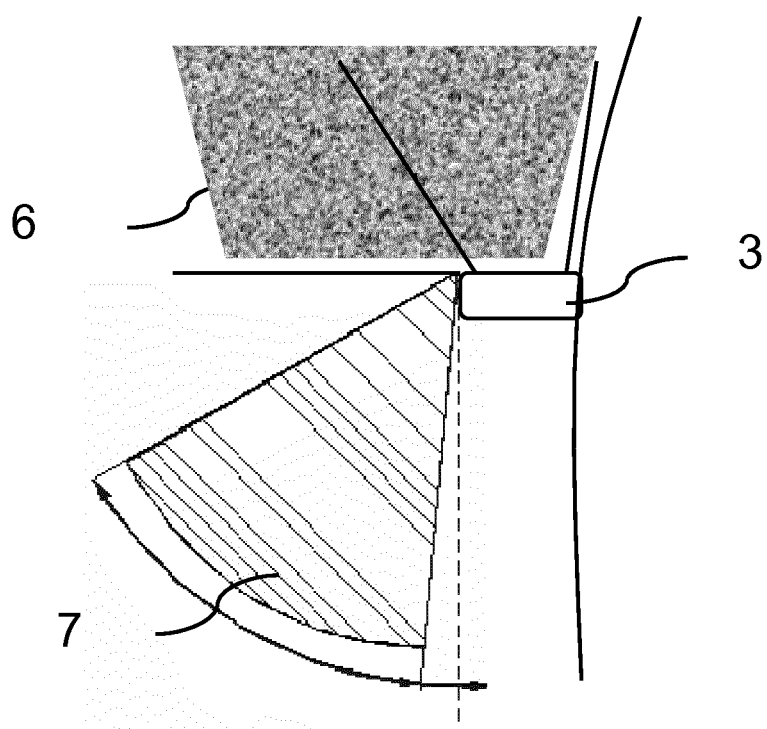
FIG. 3 illustrates an example embodiment of the invention.

FIG. 2 illustrates the area to the left alongside the vehicle 1. Exterior mirrors 3 are arranged on both sides of the vehicle. The mirrors 3 include turn-signal blinkers which illuminate the shaded area 7, which extends in a rearward quadrant between 5 degrees from the longitudinal axis of the vehicle and 55 degrees away from it. This illumination is achieved with the lights for outboard light sector L5 (see FIG. 4).

The entire area between the illuminated distributions 16, 21, 23 and 25 of the headlamps is not lit up. However, if the vehicle wants to turn, the adaptive function of the headlamps is not adaptive enough to light up the area of the roadway immediately adjacent to the vehicle side (e.g. area 6). For this purpose, a further light source for light sector L4 is used in the exterior mirror 3. This light sector L4 illuminates an area 6 which extends at least outwardly from the extension of the exterior mirrors 3 to the bodywork contour adjacent the side of the vehicle in front of the exterior mirror 3.

Figure 4:
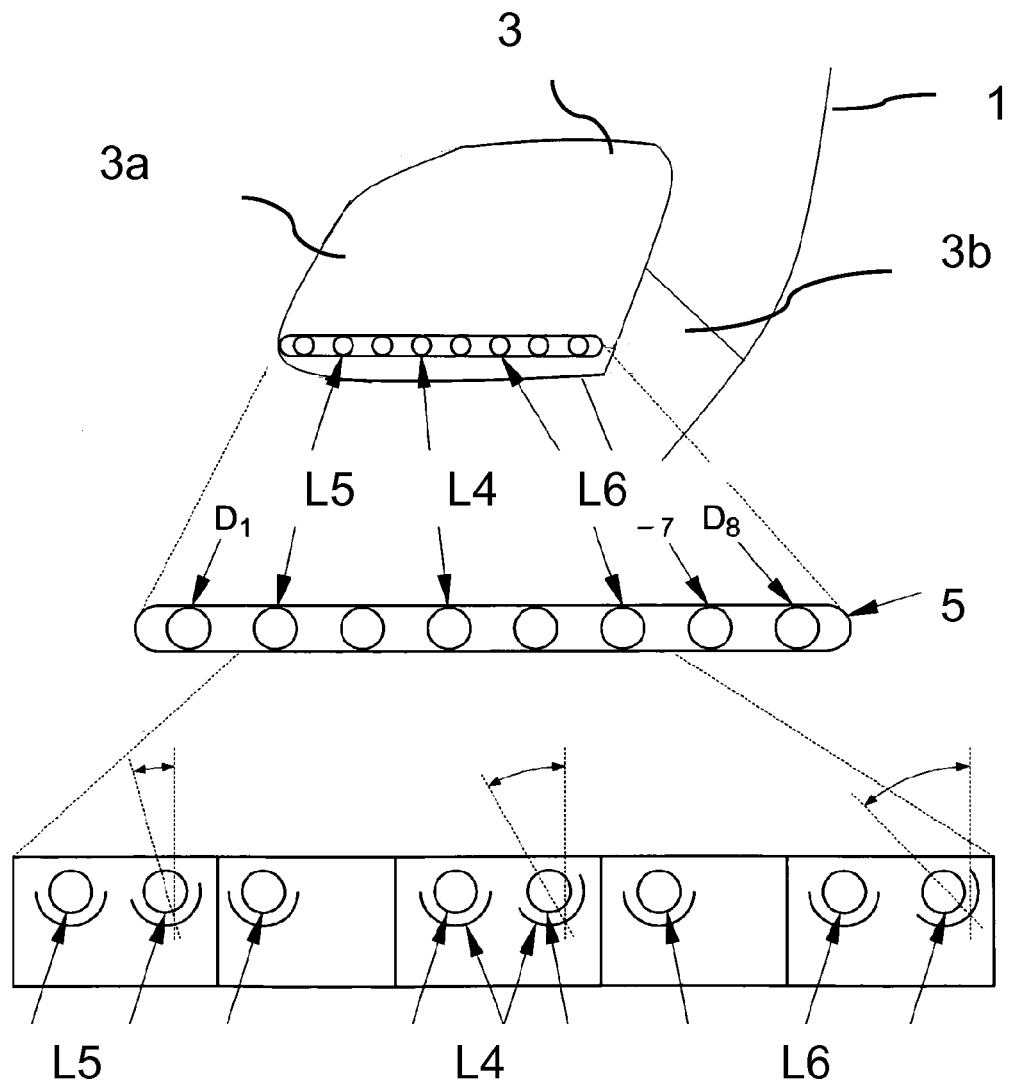
FIG. 4 illustrates the lighting in accordance with the invention.

FIG. 4 illustrates an example embodiment of an exterior mirror 3 for adaptive lighting of a vehicle. The exterior mirror 3, in this example, consists of a mirror head 3*a*, which comprises a reflecting element on its side which is not visible in the drawing, and a mirror base 3*b* with which the exterior mirror is mounted on the vehicle 1. The vehicle 1 is indicated in the drawing with a sketched contour. The exterior mirror 3 contains a lighting module 5 which, in this example, extends along the longitudinal axis of the exterior mirror, which leads away from the vehicle. In this example embodiment, the lighting module 5 may include a turn-signal blinker, a side marker light source, an integrated daytime running light (DRL) and an adaptive cornering light.

As shown in this example embodiment, the integrated daytime running light (DRL), the turn-signal blinker, and the adaptive cornering light include LEDs D1 to D8 arranged to also provide light sectors L4, L5, and L6. The light sectors L5, L4, L6 contain LEDs, in order to illuminate areas forward and to the left of the vehicle mirror for the driving situation in which the vehicle is driving along a roadway curving towards the left. In this example embodiment, the functional light sectors L4 to L6 may each share the same LED location (i.e. D1 to D8) as the functional daytime running lights. As shown in FIG. 4, light sector L5 (e.g. which may provide the turn-signal function in some embodiments) shares the same location as daytime running light LED D2; light sector L4 (e.g. which may provide the adaptive cornering light function in some embodiments) shares the same location as daytime running light LED D4, and light sector L6 shares the same location as daytime running light LED D6, and may provide this functionality. It should be understood that the lighting module 5 is not limited to the illustrated example embodiment. The number of light sectors Lx may be varied, and the arrangement of the light sectors Lx may also be varied, such as horizontally, vertically, diagonally, in a straight line, in a curved line, etc.

Further, FIG. 4 schematically illustrates optical elements as semicircular elements. The optical elements are utilized to direct the light of each DRL LED and each cornering light LED in a particular direction. The optical elements include reflectors, lenses, etc.

In another embodiment, the lighting module 5 in mirror 3 only contains a turn-signal blinker and an adaptive cornering light. As a result, only two light sectors are defined, but both may, in each case, contain light sources for the other function respectively. Since the blinking function must emit amber-colored light, the LEDs which perform the blinking function are provided only for this specific function.

In addition to the arrangement and sufficient number of LEDs for the different functions, the control system for using the adaptive cornering light in the exterior mirror is important. Since it only makes sense to use the cornering light in the exterior mirror during sharp turning maneuvers, it make sense to couple the activation of the adaptive cornering light with vehicle parameters and, in particular, with the speed. For example, it makes sense to activate the adaptive cornering light in the exterior mirror only below a threshold speed.

The lighting module 5 is controlled by means of the door control module or a controller in the exterior mirror, which receives data via a bus system. Input data is fed into the control unit. Said input data includes vehicle data such as, for example, vehicle speed, steering wheel angle, road characteristics, etc. The control unit then controls each of the adaptive light sectors Lx of the left and right lighting module, independently of each other, to turn on or off each of the LED light sectors and/or to vary their light intensity.

A useful control system is obtained, if the following vehicle parameters are met:

The vehicle is stationary or only moving at low speed, for example up to 30 km/h.
The turn signal is activated
And the running light is on.
The steering angle is greater than a threshold value.

This set of parameters defines a sharp turn at low speed in poor visibility and results in the adaptive cornering light being activated.

The invention claimed is:

1. A vehicle exterior mirror comprising:
   a mirror head adapted for mounting to an exterior side of a vehicle;
   at least one lighting module that includes a turn-signal blinker light and means for illuminating an area that extends at least alongside the vehicle to the front of the mirror head, wherein the means for illuminating is adaptively activated upon achieving a vehicle speed below a threshold speed.

2. The exterior mirror according to claim 1, further comprising a control system which receives input data about vehicle parameters selected from at least vehicle speed, turn-signal blinker light activation, running lights activation, and a steering angle, whereby the means for illuminating is adaptively activated in response to at least an additional one of these vehicle parameters.

3. The exterior mirror according to claim 2, wherein the control system activates the turn signal blinker light in addition to the adaptive cornering light.

4. The exterior mirror according to claim 2, further comprising a control system which receives input data about vehicle parameters selected from at least vehicle speed, turn-signal blinker light activation, running lights activation, and a steering angle, whereby the means for illuminating is adaptively activated in response to at least vehicle speed and steering angle.

5. The exterior mirror according to claim 1, wherein the lighting module contains a plurality of LEDs for providing different lighting functions.

6. The exterior mirror according to claim 5, wherein the plurality of LEDs are configured to provide turn-signal blinker lights, daytime running lights, adaptive cornering lights, and side marker lights.

7. The exterior mirror according to claim 5, wherein the plurality of LEDs in the lighting module define several light sectors for illuminating in several directions.

8. The exterior mirror according to claim 7, wherein at least one of the defined light sectors is directed forward for providing a daytime running light function.

9. An adaptive cornering light system comprising:
   a mirror head adapted for mounting to an exterior side of a vehicle;
   a lighting module positioned in the mirror head, the lighting module including at least one cornering LED for illuminating a cornering area along the side of the vehicle in front of the mirror head; and
   a control system for (a) receiving input data about vehicle parameters selected from at least vehicle speed, turn-signal blinker light activation, running light activation, and steering angle, and (b) activating the cornering LED for illuminating the cornering area in response to at least a vehicle speed parameter, whereby the cornering LED is adaptively activated if the vehicle speed is below a threshold speed.

10. The system according to claim 9, wherein the lighting module further includes additional LEDs configured for providing the functions of turn-signal blinker lights, daytime running lights, and side marker lights.

11. The system according to claim 9, wherein the control system activates the cornering LED for illuminating the cornering area in response to steering angle input in addition to vehicle speed input, whereby the cornering LED is adaptively activated if the control system receives input data indicating that both: (i) the steering angle is greater than a threshold value, and (ii) the vehicle speed is below a threshold speed.

12. The system according to claim 9, wherein the lighting module contains a plurality of LEDs arranged in different light sectors configured for providing different lighting functions.

13. The system according to claim 12, wherein the plurality of LEDs are configured to provide turn-signal blinker lights, daytime running lights, adaptive cornering lights, and side marker lights.

14. The system according to claim 12, wherein the different light sectors illuminate in several directions.

15. The system according to claim 14, wherein at least one of the defined light sectors is directed forward for providing a daytime running light function.

* * * * *